3,280,950
DEVICE FOR POSITIONING A MOVABLE BODY
René Magloire, Paris, France, assignor to societe anonyme dite: Etablissements Ehl-Latic, Douai, France
Filed Nov. 15, 1961, Ser. No. 152,688
Claims priority, application France, Nov. 19, 1960, 844,428, Patent 1,280,121
3 Claims. (Cl. 192—143)

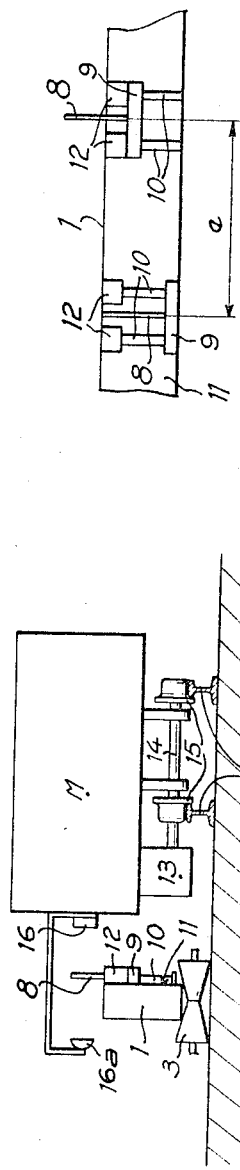

The present invention relates to a device intended to place a moving object in a simple and accurate manner in position along a rectilinear or circular trajectory. In a practical way, the point of the trajectory at which the moving object is to be placed will be obtained by its abscissa in relation to a fixed zero point.

According to the invention, the device comprises: a rule disposed along a moving body trajectory and provided, on the one hand, with regularly spaced marking means from a zero point on the rule in the direction of displacement of the moving body, the said marking means being adapted to be put selectively into either an operative or an inoperative position, and on the other hand with a graduation over a length corresponding to one spacing between two successive marking means starting from the said zero point in the opposite direction to the previously mentioned direction; means for relatively moving the said rule along the trajectory by a distance smaller than one said spacing in the direction of displacement of the moving body, the action of the said means being controlled in dependence on the indications given by a reference point in front of which the said graduation moves; and a reading device moving with the moving body and intended to emit at least one signal on the reading of a marking means in the operative position, this signal then controlling the stopping of the moving body.

The device defined above functions in the following manner: The zero point of the rule is initially placed in a position defined in relation to the fixed zero point of the trajectory of the moving body. Then, since the value $x$ of the abscissa of the point at which it is desired to place the moving body is known, and considering that the said value $x$ can be expressed by the relation:

$$x = n \cdot e + l$$

where $n$ = an integral number,
$e$ = spacing between two adjacent marking means,
$l$ = a distance less than $e$, the rule is displaced a distance $l$ from its initial position in the direction of displacement of the moving body, this distance being measured with the aid of the graduation of the rule. The $n$th marking means is then placed in the operative position, all the other means being in the inoperative position. The moving body is then placed in movement by suitable driving means, which are put out of action by the signal emitted by the reading device moving with the moving body when the said device is opposite the $n$th marking means. The moving body is thus stopped at the desired distance $x$ from the fixed zero point.

As, in general, it is foreseen that initial driving means permitting rapid displacement of the moving body to be obtained will first be operated, and then second driving means permitting slow displacement of the moving body to be achieved on approaching the position at which it is desired to place it, it is then necessary to provide two auxiliary reading devices disposed symmetrically in relation to the aforesaid reading device.

Depending on the direction of displacement of the moving body, one or the other of these two auxiliary reading means first detects the marking means in the operative position and, then, the signal emitted at that moment has the object on the one hand of putting out of action the rapid displacement driving means, and on the other hand of bringing into operation the slow displacement driving means. The middle or main reading device then puts the said slow displacement driving means out of action.

The invention will however be clearly understood with the aid of the following description of one particular embodiment, with reference to the accompanying drawings, in which:

FIGURE 1 is a diagrammatic plan view of a device made in accordance with the invention, FIGURE 2 is a view in section on the line II—II in FIGURE 1, and FIGURE 3 is a detail view in elevation of a side face of the rule of the device.

The drawings show a rule 1 disposed parallel to the trajectory or track 2 travelled over by a moving body M. The rule 1 can slide on carrier rollers 3 under the control of a pinion 4 meshing with a toothed rack cut on the bottom face of the rule 1. The pinion 4 is controlled through a spindle 5 operated by a handwheel 6.

Starting from a zero point 0, the rule 1 is provided in a direction opposite to the intended displacement of the moving body with graduations 7 in millimetres, for example over a length of 0.50 metre. A vernier 7a is provided and enables $\frac{1}{10}$ millimetre to be read.

Along the rule 1, starting from its zero point 0 and spaced apart by a distance equal to 0.50 metre for example, there are provided marking means $m$ (FIGURE 1), each constituted, in this example, by a wire 8 fixed on a block 9, this assembly sliding along guides 10 solid with one side face 11 of the rule 1, as can be seen in FIGURES 2 and 3. The action of an electromagnet 12 controlled from a fixed station causes the wire 8 to appear above the rule 1.

In order to predetermine a distance of 5.6472 metres for example, at which it is desired to place the moving body M, an operator situated at the zero point actuates the handwheel 6 in order to displace the rule 1 a length of 0.1472, which can be read on the graduation 7 with the aid of the vernier 7a. Through the action of the appropriate electromagnet 12, he then causes the wire 8 of the marking means $m$ corresponding to the length of 5.50 metres to appear above the rule 1, that is to say the 11th marking means $m$ from the zero point 0 of the rule 1.

This predetermination of the distance having been effected, the moving body M, driven by the driving means 13 comprising a variable speed motor equipped with an electric brake and acting through an axis 14 on two driving rollers 15, is displaced at the maximum speed on the track 2.

A reading device comprising two auxiliary photoelectric cells 16, a middle photoelectric cell 17, and their associated projectors 16a and 17a, and solid with the moving body M is provided. This device is moved along the rule 1 in such a manner that a wire 8 in the operative position can intercept the light rays passing from the projectors 16a and 17a to the corresponding photoelectric cells 16 and 17.

When, depending on the direction of displacement of the moving body M, one or the other of the end photoelectric cells 16 passes opposite the wire 8, the appearance of which above the rule has been predetermined, the speed of displacement of the moving body M drops to the minimum speed of the motor contained in the driving means 13.

When the middle photoelectric cell 17 in turn passes opposite the wire 8 in the operative position, the moving body M, which is already moving at minimum speed, is stopped by the stoppage of the motor, which is instantaneous owing to the action of the electric brake with which it is provided. The control of the moving body M in accordance with the electrical impulses of the photoelectric cell is well known and does not form part of the present invention. The control may be effected, for example, in accordance with the means illustrated in U.S. Patent 2,871,716.

The embodiment described above and illustrated in the drawings is given only by way of illustration. It will easily be understood that the practical realisation of the different constituent elements of the device may be modified in many ways, without however changing the functional character, that is to say while remaining within the scope of the invention.

In particular, it would be possible to consider the use of a fixed rule 1 and a track, on which the moving body is displaced, which is capable of being displaced longitudinally by a length less than one spacing between two successive or adjacent marking means.

What is claimed is:

1. Apparatus for positioning a movable body adapted for moving at relatively high speed along a preestablished trajectory, said apparatus comprising a rule extending adjacent said trajectory, a plurality of marking means on said rule extending from a reference location in the direction of movement of the movable body at regularly spaced intervals, means for selectively energizing the marking means one by one to move the same from an inoperative to an operative position, said rule being provided with graduations over a length corresponding to the spacing between adjacent marking means, the graduations extending from the reference location in a direction away from the direction of travel of the body, means for relatively moving the rule parallel to the trajectory by a distance less than the spacing between adjacent marking means and corresponding to the fractional proportion of said spacing exceeding the number of equal spacings that it is desired to move the movable body, and a reading device secured to the movable body for movement therewith, said reading device including first and second sensing means which are spaced in the direction of movement of the body to sense the particular marking means which is in operative position, the first sensing means causing the moving body to slow down when it senses the operative marking means, the second sensing means causing the moving body to stop in alignment with said operative marking means when it senses the same.

2. Apparatus for positioning a movable body at a preestablished location with respect to a reference location, the movable body being supported for movement at relatively high speed along a preestablished trajectory, said apparatus comprising: a measuring device disposed parallel to the trajectory of the movable body, means supporting the measuring device for movement along a path parallel to said trajectory, a plurality of marking means on said measuring device at regularly spaced locations, the measuring device being divided into further regularly spaced subdivisions between a pair of adjacent marking means, the measuring device being adapted for being positioned with a desired subdivision in alignment with the reference location such that each of the marking means represents a correlated distance from the reference location, means for selectively energizing each of the marking means whereby that marking means corresponding to the preestablished location for the movable body can be energized and first and second sensing means on the movable body located in spaced relation in the direction of movement of the moving body for successively registering with the energized one of said marking means to slow down the movable body when the first sensing means senses the energized marking means and then to stop the movable body when the second sensing means senses the energized means.

3. Apparatus for positioning a movable body adapted for moving at relatively high speed along a preestablished trajectory, said apparatus comprising a rule extending adjacent said trajectory, marking means on said rule extending from a reference location in the direction of movement of the movable body at regularly spaced intervals, means for selectively energizing the marking means one by one to move the same from an inoperative to an operative position, said rule being provided with graduations over a length corresponding to the spacing between adjacent marking means, the graduations extending from the reference location in a direction away from the direction of travel of the body, means for relatively moving the rule along the trajectory by a distance less than the spacing between adjacent marking means and corresponding to the fractional proportion of said spacing exceeding the number of equal spacings that it is desired to move the movable body, and a reading device secured to the movable body for movement therewith, said reading device being sensitive to the energization of the particular marking means to control the moving body to cause the latter to stop in alignment with said particular marking means, said reading device comprising at least two marking means detecting units spaced apart from each other by a distance parallel to the trajectory of said movable body, each of said detecting units comprising a light projector unit disposed to one side of said rule and an aligned light detecting cell disposed to the other side of said rule so that when the light beam of one of said units is broken by the energized one of said marking means, the output signal from its respective detecting cell serves to slow down said movable body and when the light beam of the other of said units is thus broken the output from its respective detecting cell serves to stop said movable body.

References Cited by the Examiner

UNITED STATES PATENTS

| 2,043,625 | 6/1936 | Lindner | 33—125 |
|---|---|---|---|
| 2,311,142 | 2/1943 | Turrettini | 192—143 |
| 2,473,506 | 6/1949 | Bullard | 192—143 |
| 2,694,804 | 11/1954 | Wagner | 192—143 |
| 2,871,716 | 2/1959 | Stade | 192—143 |
| 2,987,953 | 6/1961 | Stade | 88—148 |
| 3,004,345 | 10/1961 | Gaebel | 33—107 |
| 3,037,420 | 6/1962 | Stade | 250—234 X |

ARTHUR L. LA POINT, *Primary Examiner.*

THOMAS J. HICKEY, LEO QUACKENBUSH, EUGENE G. BOTZ, *Examiners.*

R. V. SLOAN, S. B. GREEN, *Assistant Examiners.*